Figure 1:
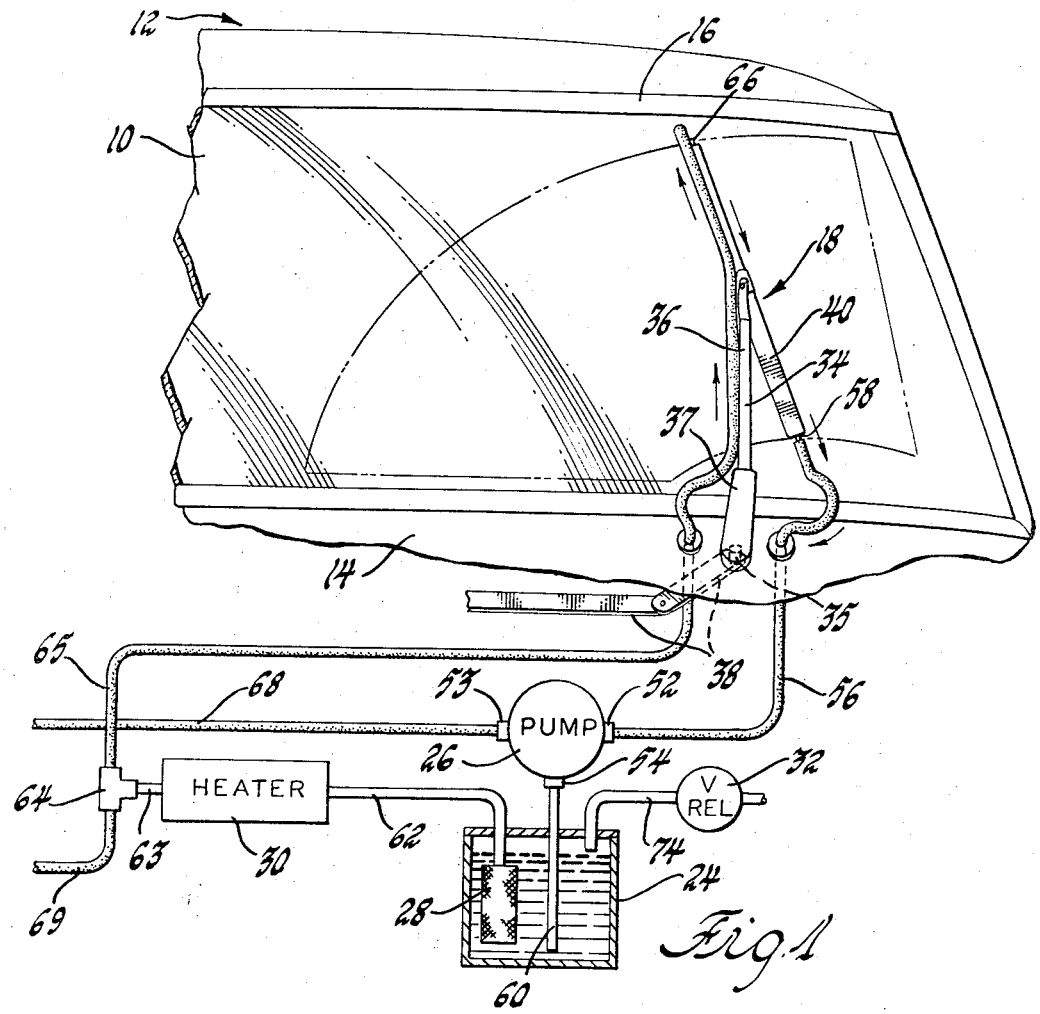

United States Patent [19]
Klomp

[11] 3,716,886
[45] Feb. 20, 1973

[54] WINDSHIELD CLEANER SYSTEM

[75] Inventor: Edward D. Klomp, Mt. Clemens, Mich.

[73] Assignee: General Motors Corporation, Detroit, Mich.

[22] Filed: March 29, 1971

[21] Appl. No.: 128,908

[52] U.S. Cl............................................15/250.04
[51] Int. Cl.................................................B60s 1/48
[58] Field of Search.........15/250.01, 250.02, 250.03, 15/250.04, 250.05, 250.06, 250.36; 118/DIG. 23

[56] References Cited

UNITED STATES PATENTS

| | | | |
|---|---|---|---|
| 2,168,202 | 8/1939 | Grantham | 15/250.04 |
| 3,342,164 | 9/1967 | Lewis | 118/DIG. 23 |
| 3,591,887 | 7/1971 | Keddie | 15/250.02 |

FOREIGN PATENTS OR APPLICATIONS

| | | | |
|---|---|---|---|
| 523,394 | 10/1953 | Belgium | 15/250.01 |
| 693,496 | 7/1940 | Germany | 15/250.04 |
| 548,561 | 9/1956 | Italy | 15/250.04 |

*Primary Examiner*—Peter Feldman
*Attorney*—W. E. Finken and W. A. Schuetz

[57] ABSTRACT

In a preferred form, this disclosure relates to a windshield cleaning system wherein washer fluid is continuously circulated by a pump from a reservoir through a flexible wiper blade and back to the reservoir. The wiper blade is mounted for oscillating movement across the outer surface of the windshield and has a passage therethrough in communication with the other surface of the windshield through which the washer fluid continuously circulates. The wiper blade has lip portions which engage the outer surface for wiping the same end for substantially preventing leakage of the washer fluid circulating through the passage between the wiper blade and the windshield. The windshield is cleaned by virtue of the contact of the continuously circulating cleaning fluid and the engagement of the wiper blade moving thereacross.

2 Claims, 2 Drawing Figures

PATENTED FEB 20 1973  3,716,886

INVENTOR.
Edward D. Klomp
BY
W.A. Schuetz
ATTORNEY

WINDSHIELD CLEANER SYSTEM

The present invention relates to a windshield cleaning system, and more particularly to a windshield cleaning system which utilizes both an oscillating wiper blade and washer fluid continuously circulated through the wiper blade to clean the outer surface of the windshield.

Windshield cleaning systems commonly comprise a wiper unit with a flexible wiper blade which is moved in opposite directions across the outer surface of a windshield and a washer unit which discharges a spray of washer fluid onto the outer surface of the windshield and into the path of the moving wiper blade. The washer unit usually includes a reservoir for containing a supply of washer fluid. Because the washer fluid is discharged from the reservoir by the washer unit, the reservoir must be periodically replenished. Because the level of the reservoir can normally be checked only by visual inspection, a lack of washer fluid can occur at inconvenient times. Further, the necessity of replenishing the supply of washer fluid and regularly checking the level of the reservoir can be inconvenient.

The windshield cleaning system according to the preferred embodiment of the present invention provides for the continuous circulation of the washer fluid by a pump from a reservoir of washer fluid, through a wiper blade, and back to the reservoir. The wiper blade is moved in a conventional oscillatory manner across the outer surface of the windshield and has a passage therethrough in communication with the outer surface of the windshield which provides for the continuous circulation of the washer fluid through the wiper blade and against the outer surface. The wiper blade, which is flexible or resilient, has lip portions which engage the outer surface of the windshield for wiping the same during the oscillating movement of the wiper blade thereacross and for substantially preventing leadage of the washer fluid circulating through the passage between the wiper blade and the outer surface of the windshield. The system further includes a filter for filtering foreign material from the washer fluid following its circulation through the wiper blade and a relief valve for releasing any air which has entered the system. A heater is preferably incorporated into the system to heat the washer fluid prior to circulation through the wiper blade. The outer surface of the windshield is cleaned by the continuous contact and flow of the circulating washer fluid on the outer surface and the oscillating wiping movement of the wiper blade which is in engagement with the outer surface.

Accordingly, an important object of the present invention is to provide a new and improved windshield cleaning system wherein washer fluid is continuously circulated through an oscillatable, flexible wiper blade and with the washer fluid being in contact with the outer surface of the windshield as it is circulated therethrough.

Another object of the present invention is to provide a new and improved windshield cleaning system wherein the washer fluid is continuously circulated from a reservoir, to a flexible wiper blade and against the outer surface of a windshield to clean the outer surface, and then back to the reservoir where it is filtered to remove foreign material therefrom prior to recirculation.

Another object of the present invention is to provide a new and improved windshield cleaning system as defined in any of the preceding objects, wherein the washer fluid is heated.

Another object of the present invention is to provide a new and improved windshield cleaning system, as defined in any of the preceding objects, wherein excess air which has entered the system is released by a relief valve.

Figure 2:
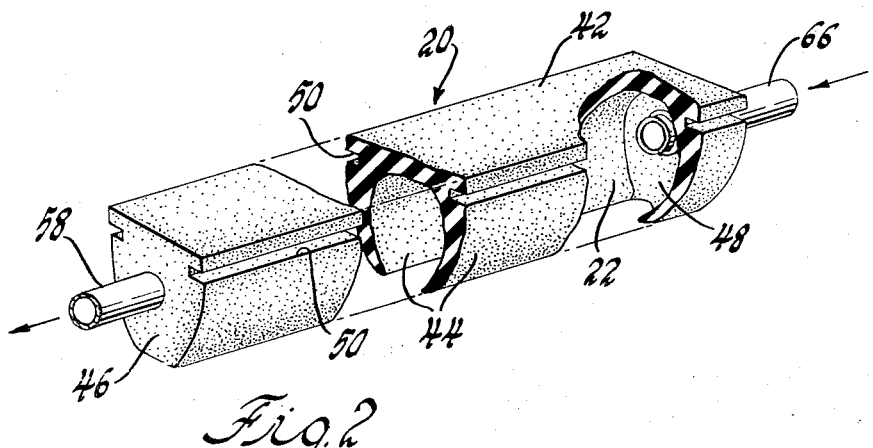

These and other object of the invention will become more fully apparent from the following description and drawing wherein:

FIG. 1 schematically shows a preferred embodiment of the windshield cleaning system of the present invention;

FIG. 2 is a perspective view of the wiper blade of the windshield cleaning system of the present invention and with portions thereof cut away.

As representing a preferred embodiment of the present invention, the drawing shows a windshield cleaning system for cleaning the outer surface of a windshield 10 of an automotive vehicle 12. The windshield 10 is supported by suitable body structure 14 of the vehicle 12 and is surrounded by a reveal molding 16.

The windshield cleaning system broadly comprises an oscillatory windshield wiper 18 including a flexible wiper blade 20 having a passage 22 therethrough which is in communication with the windshield 10 and through which washer fluid is adapted to be circulated; a reservoir 24 for containing a supply of washer fluid; a pump 26 for pumping the washer fluid from the reservoir 24 through the wiper blade 20 and back to the reservoir 24; a filter 28 for filtering the washer fluid; a heater 30 for heating the washer fluid, and a relief valve 32 for releasing any air which enters the system. The windshield 10 is cleaned by the wiping action of the oscillating wiper blade 20 and by the washer fluid which contacts the windshield 10 as it is circulated through the wiper blade 20.

Referring to FIGS. 1 and 2, the wiper 18 includes a conventional wiper arm 34 which is secured at its lower end to a drive pivot 35 which is rotatably supported adjacent the lower edge of the windshield 10 by the body structure 14 of the vehicle 12. The wiper arm 34 has spring hinged connected upper and lower sections 36 and 37 for biasing the wiper blade 20 into engagement with the windshield 10.

The wiper arm 34 is oscillated about the drive pivot 35 by a suitable or conventional drive mechanism which includes a linkage means 38 and a wiper motor, not shown. The wiper arm 34 at its upper end carries a conventional wiper blade holder 40 for supporting the wiper blade 20.

The wiper blade 20 is made from a suitable flexible or resilient material, preferably rubber, and has a rectangularly shaped upper portion 42. The wiper blade 20 also has a pair of spaced resilient lip portions 44 which project downwardly from the opposite sides of the upper portion 42, as shown in FIG. 2, and engage windshield 10 along the length of the wiper blade 20. The wiper blade 20 further has a pair of end sections 46 and 48 which project downwardly from the upper section 42, as shown in FIG. 2, and are integral with the lip portions 44 at the ends of the wiper blade 20. The wiper blade has a pair of slots 50 which are located in the opposite sides thereof and immediately below the upper portion 42 and which extend in a parallel fashion for the length of the wiper blade 20. The slots 50 receive a suitable flexible backer or strip, not shown, which is connected to the blade holder The backer connects the wiper blade 20 to the blade holder 40. The upper portion 42, lip portions 44, and end sections 46 and 48 define the passage 22 through the wiper blade 20 which is in communication with windshield 10. The passage 22 is adapted to have washer fluid continuously circulated therethrough and with the washer fluid engaging or contacting the outer surface of the windshield 10 as it is circulated therethrough. The resilient lip portions 44 and end sections 46 and 48 of the wiper blade 20, which is biased into engagement with the windshield, sealingly engage the windshield to prevent or substantially prevent leakage of any washer fluid between the wiper blade 20 and the outer surface of windshield 10 as the washer fluid is circulated through the passage 22 and the wiper 18 is oscillated across the windshield.

The washer fluid which is continuously circulated through the wiper blade 20 is stored within an enclosed reservoir 24.

The washer fluid is continuously circulated from the reservoir 24, through the wiper blade 20 and back to the reservoir 24 by a suitable pump 26. The pump 26 is preferably driven by the wiper motor, not shown, and has a pair of inlets 52 and 53 and an outlet 54. The inlet 52 of the pump 26 is in communication with the lower end of the passage 22 in the wiper blade 20, as shown in FIG. 1, via flexible conduit 56 and a nipple 58 carried by the wiper blade 20. The outlet 54 of the pump 26 is in communication with the interior of the reservoir 24 via a conduit 60. The reservoir 24 with its supply of washer fluid communicates with the upper end of passage 22 via filter 28, conduit 62, heater 30, conduit 63, tee 64, flexible conduit 65 and nipple 66 carried by the wiper blade 20.

From the above description, it should be apparent that the pump 26 draws washer fluid from the reservoir and circulates it through the wiper blade 20 back to the reservoir 24. The circulatory path is from reservoir 24, filter 28, conduit 62, heater 30, conduit 63, tee 64, conduit 65, nipple 66, passage 22 in the wiper blade 20, conduit 56, pump 26, conduit 60 to the reservoir 24.

While only the wiper 18 for the driver's side of the vehicle has been shown on the drawing, it will, of course, be understood that an identical wiper would be provided for the passenger side of the vehicle. The latter wiper would have the lower end of its passage connected to the inlet 53 of the pump 26 via a flexible conduit 68 and its upper end connected to the tee 64 via flexible conduit 69.

Leakage of washer fluid from passage 22 between the wiper blade 20 and the windshield 10 is further prevented by virtue of the fact that the pump 26, which draws washer fluid toward its inlet 52 from the passage 20, circulates the washer fluid through the wiper blade 20 at a pressure which is below atmospheric pressure. Thus, if the lip portions 44 of wiper blade 20 do not completely or continuously engage the outer surface of windshield 10, air will be drawn into the passage 22 rather than washer fluid leaking therefrom.

Any air entering the system, however, is released by a relief valve 32. The relief valve 32 is in communication with the upper end of the reservoir 24 via conduit 74.

The filter 28 for filtering the washer fluid to remove foreign material therefrom as it circulates through the system can be of any suitable or conventional construction. The filter 28 is located in the interior of the reservoir 24 and is attached to the lower end of conduit 62 which projects therein.

The heater 30 for heating the washer fluid can be of any suitable or convention construction. The heater 30 can either be an electrical heater or utilize engine coolant fluid circulated in heat exchange relationship with the washer fluid. The heater 30 enables washer fluids having a higher freezing point to be utilized.

It can be seen from the foregoing description that, when pump 26 is activated, washer fluid in the reservoir 24 enters filter 28, which removes foreign material from the washer fluid, and then flows through conduit 62 into the heater 30 which heats the washer fluid. The washer fluid from the heater 30 flows via conduit 63, tee 64, conduit 65, nipple 66 into the passage 22 in the wiper blade 20. When the heated washer fluid enters passage 22 it contacts and flows against the outer surface of windshield 10 and thereby removes foreign material therefrom and deices the windshield. The oscillating motion of wiper 18 produces a wiping action by the lip portions 44 of the wiper blade 20 which in combination with the cleaning action of the washer fluid serves to clean the outer surface of windshield 10. After circulation through passage 22, the washer fluid passes via nipple 58 and conduit 56 through the inlet 52 of the pump 26 and thence through the outlet 54 to the reservoir 24 via conduit 60.

The foregoing disclosure relates to only one embodiment of the invention which may be modified within the scope of the appended claims.

What is claimed is:

1. A windshield cleaning system for cleaning the outer surface of a windshield comprising: an enclosed cleaning fluid supply; wiper means having a pivoted wiper arm for oscillating movement across said windshield surface, said wiper means including a wiper blade of flexible material, said wiper blade having an upper portion and a pair of spaced lip portions integral with the upper portion and contacting said windshield surface for substantially the entire length of said wiper blade; said wiper blade having upper and lower end portions for enclosing the ends of said wiper blade between said lip portions; said upper portion, lip portions, and end portions of said wiper and said windshield surface disposed between said lip portions defining a passage therebetween, said passage having an inlet at its upper end portion and an outlet at its lower end portion to have cleaning fluid continuously circulated throughout its length; said lip portions of said wiper blade wiping said windshield surface and said lip portions and said end portions substantially preventing leakage of said cleaning fluid from said passage between said wiper blade and said windshield surface; conduit means including pump means to provide for continuous circulation of said cleaning fluid from said supply, through said wiper blade, and back to said supply whereby said windshield surface is cleaned by the contact of the continuously circulating cleaning fluid and the engagement of the moving wiper blade across the windshield; a relief valve operatively connected with the system to exhaust any air entering the system; and a filter for filtering said cleaning fluid being circulated through said system.

2. A windshield cleaning system for cleaning the outer surface of a windshield comprising; an enclosed cleaning fluid supply; wiper means having a pivoted wiper arm for oscillating movement across said windshield surface, said wiper means including a wiper blade of flexible material, said wiper blade having an upper portion with a pair of spaced lip portions contacting said windshield surface for substantially the entire length of said wiper blade; said wiper blade having end portions for enclosing the ends of said wiper blades between said lip portions, one of said end portions having an inlet opening and the other of said end portions having an outlet opening; said upper portion, lip portions, and end portions of said wiper and said windshield surface disposed between said lip portions defining a passage therebetween through which the cleaning fluid is continuously circulated via said inlet and outlet openings of said end portions; said lip portions of said wiper blades wiping said windshield surface and said lip portions and said end portions substantially preventing leakage of said cleaning fluid from said passage between said wiper blade and said windshield surface; first conduit means to provide for continuous circulation of said cleaning fluid from said supply to said inlet opening of said wiper blade; second conduit means including pump means to provide for continuous circulation of said cleaning fluid through said wiper blade and said outlet opening back to said supply whereby said windshield surface is cleaned by the contact of the continuously circulating cleaning fluid and the engagement of the moving wiper blade across the windshield; a relief valve operatively connected with the system to exhaust air entering the system; heater means for heating said cleaning fluid being circulated through said wiper blade; and a filter at one end of said first conduit means and within said supply for filtering said cleaning fluid being circulated through said system.

* * * * *